United States Patent [19]

Kosydar et al.

[11] 4,164,080
[45] Aug. 14, 1979

[54] BASIC SIMULATOR UNIT

[75] Inventors: Gerald M. Kosydar, Vestal; Albert J. Rider, Binghamton, both of N.Y.; Alan A. Trussler, Worthing, England

[73] Assignee: The Singer Company, Binghamton, N.Y.

[21] Appl. No.: 795,519

[22] Filed: May 10, 1977

[51] Int. Cl.² ............................................. G09B 9/08
[52] U.S. Cl. ................................................. 35/12 P
[58] Field of Search .................. 35/11 A, 12 R, 12 C, 35/12 D, 12 E, 12 F, 12 G, 12 H, 12 K, 12 L, 12 N, 12 P, 12 Q, 12 S, 12 T, 12 W, 10.2; 272/1 C

[56] References Cited

U.S. PATENT DOCUMENTS

| | | | |
|---|---|---|---|
| 1,825,462 | 9/1931 | Link, Jr. | 35/12 P |
| 2,306,429 | 12/1942 | Edwards | 35/12 W |
| 2,385,095 | 9/1945 | McCarthy | 35/12 W |
| 3,003,251 | 10/1961 | White, Jr. et al. | 35/12 T |
| 3,012,337 | 12/1961 | Spencer, Jr. et al. | 35/12 N |
| 3,057,083 | 10/1962 | Franck | 35/12 Q |
| 3,083,473 | 4/1963 | Luton | 35/12 C |
| 3,295,224 | 1/1967 | Cappel | 35/12 P |
| 3,720,007 | 3/1973 | McKechnie et al. | 35/12 N |
| 3,732,630 | 5/1973 | Crosbie et al. | 35/12 N |

FOREIGN PATENT DOCUMENTS 834662   5/1960   United Kingdom .................... 35/12 P

OTHER PUBLICATIONS

Navigational Trainer Mark IV Operation Manual and Parts Catalog, Jan. 194, cover, title page, pp. 2-5.
"Machines to Help Pilots", Popular Science, Oct. 1946, pp. 82-83.
Aviation Week and Space Technology, Aug. 23, 1976, pp. 60-62.

Primary Examiner—William H. Grieb
Attorney, Agent, or Firm—J. Dennis Moore; Jeff Rothenberg

[57] ABSTRACT

A flight simulator which abandons the traditional aesthetic preference for an aircraft-like flight compartment exterior in favor of an open strut cockpit construction affording convenient access to cockpit equipment for maintenance purposes. The simulated flight compartment, electronic equipment, a visual display and maintenance walkway are all enclosed within an octagonal enclosure and mounted on a motion system.

21 Claims, 5 Drawing Figures

BASIC SIMULATOR UNIT

RELATED APPLICATION

A related design application Ser. No. 795,518, entitled Simulator Enclosure by Alan A. Trussler is being filed concurrently.

BACKGROUND OF THE INVENTION

1. Field of the Invention

This invention relates to vehicle simulation in general and more particularly, to a basic simulator unit especially useful in flight simulation.

2. Description of the Prior Art

Today's sophisticated flight and mission simulators trace their genealogy back to the grounded flight trainers developed by Edwin A. Link, Jr. in the 1930's. As illustrated in U.S. Pat. No. 1,825,462, the early LINK training devices were constructed in the form of miniature airplanes which could accommodate a pilot trainee. These early LINK trainers, as well as the later generations of general aviation trainers, were designed primarily to teach basic flying skills and were thus constructed without emphasis on any particular aircraft.

In contrast to the "general" aircraft configuration of such flight trainers, flight simulators have traditionally been designed to duplicate the appearance and operation of particular aircraft. Commercial passenger aircraft simulation has, for example, been carried out on a per aircraft basis, i.e., by utilizing the actual aircraft's shape and systems as a basis for the simulated aircraft's design. Up until now, strict adherence to the principle that the visual appearance of the simulator (both interior and exterior) should be as close as possible to that of the actual aircraft, has been a design ground rule.

Over the years aircraft simulators have become more and more technically sophisticated. Modern day simulators are driven by computer and are mounted on synergistic six degree of freedom motion systems. Fiberglass shells reproduce the total exterior profile of the flight deck; with interior equipment, often actual aircraft parts, supported from said shell so as to exactly duplicate the interior of the cockpit. Increased realism is achieved by the addition of a visual system which relays realistic infinity images to the occupants of the cockpit.

These flight simulators are widely accepted because they provide the capability and fidelity to safely and effectively train flight crew members in execution of normal, abnormal and emergency operating procedures. Situations such as engine-outs can be created in a flight simulator, which would not be prudent or practical to attempt in the actual aircraft. Further, simulators reduce the need for non-revenue training flights and conserve aviation fuel.

In the early 1960's, flight simulator designers turned to digital rather than analog computation techniques to solve the technical problems associated with the simulation of complex, high-performance aircraft. This technological breakthrough made it economical to extend and refine the simulation math models while concurrently offering levels of accuracy and resolution that had previously been unattainable. This transition to digital technology did not, however, mark any change in the design philosophy which required duplication of the cockpit exterior as well as its interior.

The decade of the 1970's has brought a new set of unique challenges to the flight simulation industry. In view of the international energy crisis and persistent inflation, simulation equipment must not only be technically superior to meet present and expected requirements, but also must be designed in such a way that simulator costs do not follow projected inflationary trends.

SUMMARY OF THE INVENTION

The basic simulator unit of the instant invention meets these challenges through an entirely new approach to flight simulator construction. By abandoning the traditional aesthetic preference for an aircraft-like flight compartment exterior in favor of an open strut cockpit construction and a surrounding all-encompassing enclosure, the instant invention provides not only significant operating and maintenance advantages but also a marked reduction in the cost of simulator ownership.

According to the instant invention, a simulated flight compartment is constructed so that its interior replicates the interior of the particular aircraft being simulated, but—unlike earlier simulators—its exterior comprises an open framework. This unique flight compartment, along with open racks supporting associated electronics, an optional visual display and a maintenance platform are all supported on a motion base and enclosed within an enclosure (preferably octagonal).

One object of the present invention is to provide a simulated flight compartment that abandons the traditional aesthetic preference for an aircraft-like exterior in favor of an open strut construction which simplifies cockpit equipment installation and maintenance.

Another object is to provide a flight simulator which is significantly superior over its predecessors in operation and maintainability.

Still another object is to provide a flight simulator which offers lower life cycle costs and greater simulator availability.

Yet another object is to provide an optimal flight simulator configuration which affords improved cockpit interior, reduces required facility floor space, permits efficient and economical fire protection, facilitates easy shipment and minimizes recurring engineering work.

A further object is to provide a basic simulator unit exhibiting a closed, clean and controlled environment.

A still further object is to provide a flight simulator which is particularly adaptable to the simulation of all wide body type aircraft with minimum equipment redesign and relocation.

Other objects and advantages of the invention will, in part, be obvious and will, in part, appear hereinafter.

BRIEF DESCRIPTION OF THE DRAWINGS

For a fuller understanding of the nature and objects of the invention, reference should be had to the following detailed description taken in conjunction with the accompanying drawings in which.

DETAILED DESCRIPTION

Figure 1:
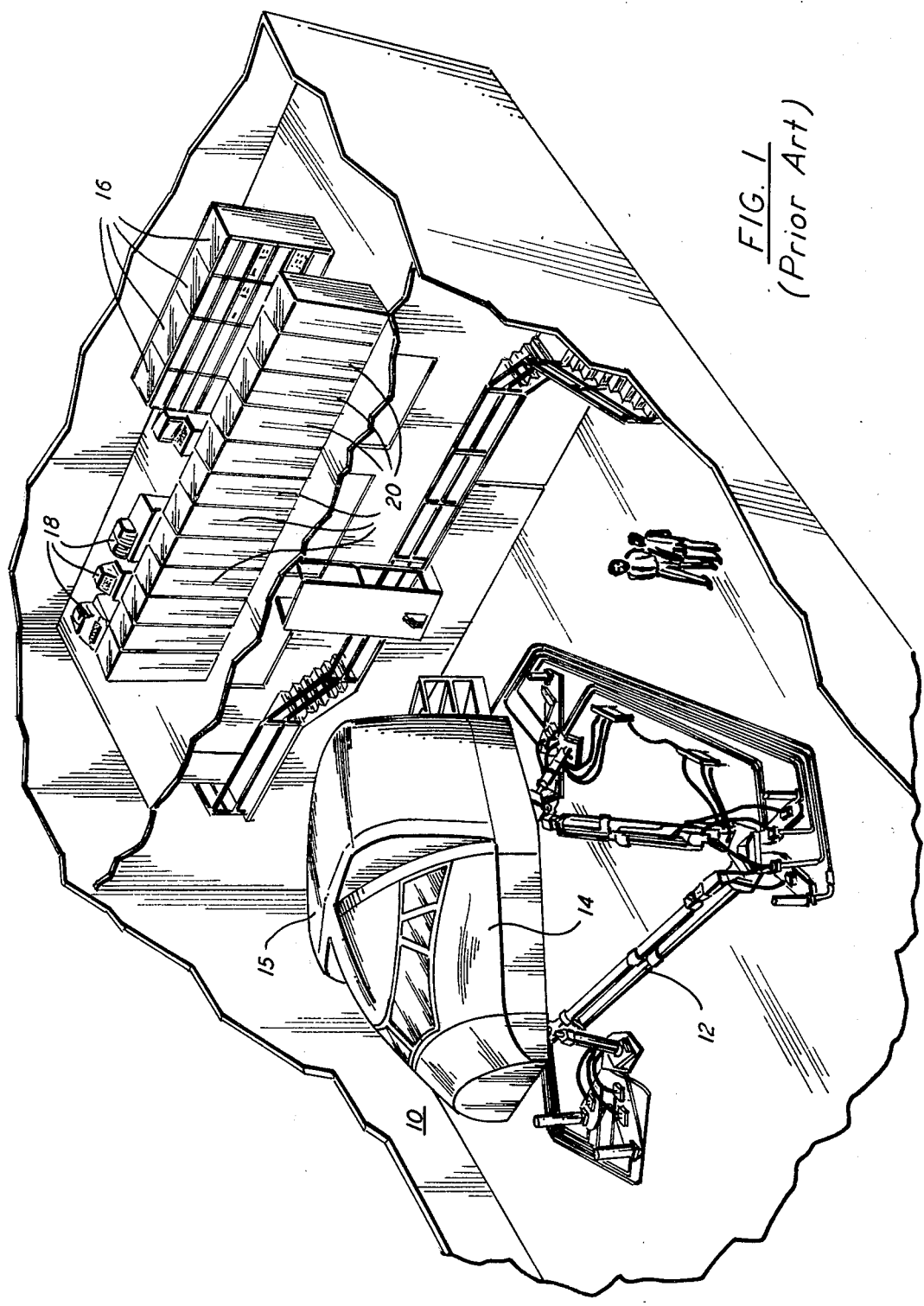
FIG. 1 is a perspective view of a prior art flight simulator.

FIG. 1 illustrates a typical prior art flight simulator of a wide body or heavy payload aircraft. As shown, a simulated flight compartment or cockpit 10 is mounted upon a synergistic six degree of freedom motion system 12. This motion system is capable of imparting lateral, longitudinal and vertical displacements as well as yaw, pitch and roll movements to said flight compartment, in a well known manner.

On the inside of the simulated flight compartment, the controls, instruments, indicators, panels, etc. of the crew stations of the actual aircraft are duplicated, as closely as possible, in appearance, location and operation. Often much of this cockpit equipment comprises actual aircraft hardware. The equipment is mounted within and generally supported by a fiberglass shell 14 shaped to resemble the exterior profile of the actual aircraft.

An instructor/observer section 15 is located behind the simulated flight compartment. At a separate location, a bank of computers 16, computer peripheral equipment 18, and a myriad of interface cabinets 20 are provided to control the operation of the simulator.

The basic simulator unit (BSU) of the instant invention is similar in many respects to the earlier simulated flight decks. It can, for example, be mounted on a six degree of freedom motion system and includes a replica of the interior of the actual aircraft's cockpit. Unlike its predecessors, the BSU forsakes aircraft-like exterior appearance in favor of an open strut construction which provides ready access for cockpit equipment maintenance, and an all-encompassing enclosure which affords a controlled environment for personnel and equipment.

Figure 2:
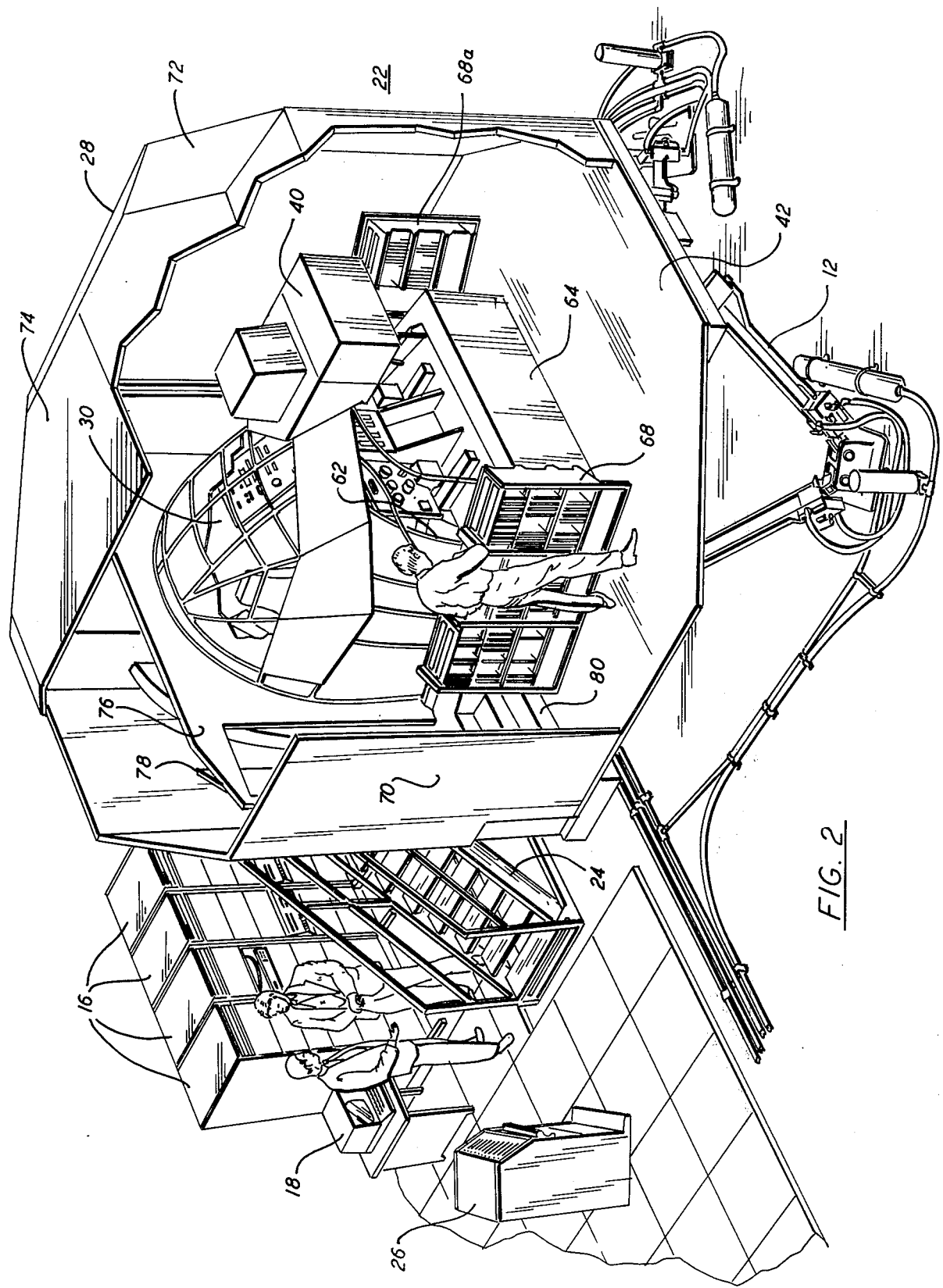
FIG. 2 is a perspective cut-away view of the basic simulator unit of the instant invention.

As depicted in FIG. 2, the flight simulator of the instant invention includes a basic simulator unit, generally designated 22, mounted on a motion system 12. Access to the basic simulator unit is provided by a hydraulically actuated, retractable staircase 24. Computer cabinets 16, peripheral equipment 18 and a motion electronics cabinet 26 are located on the facility floor.

Figure 3:
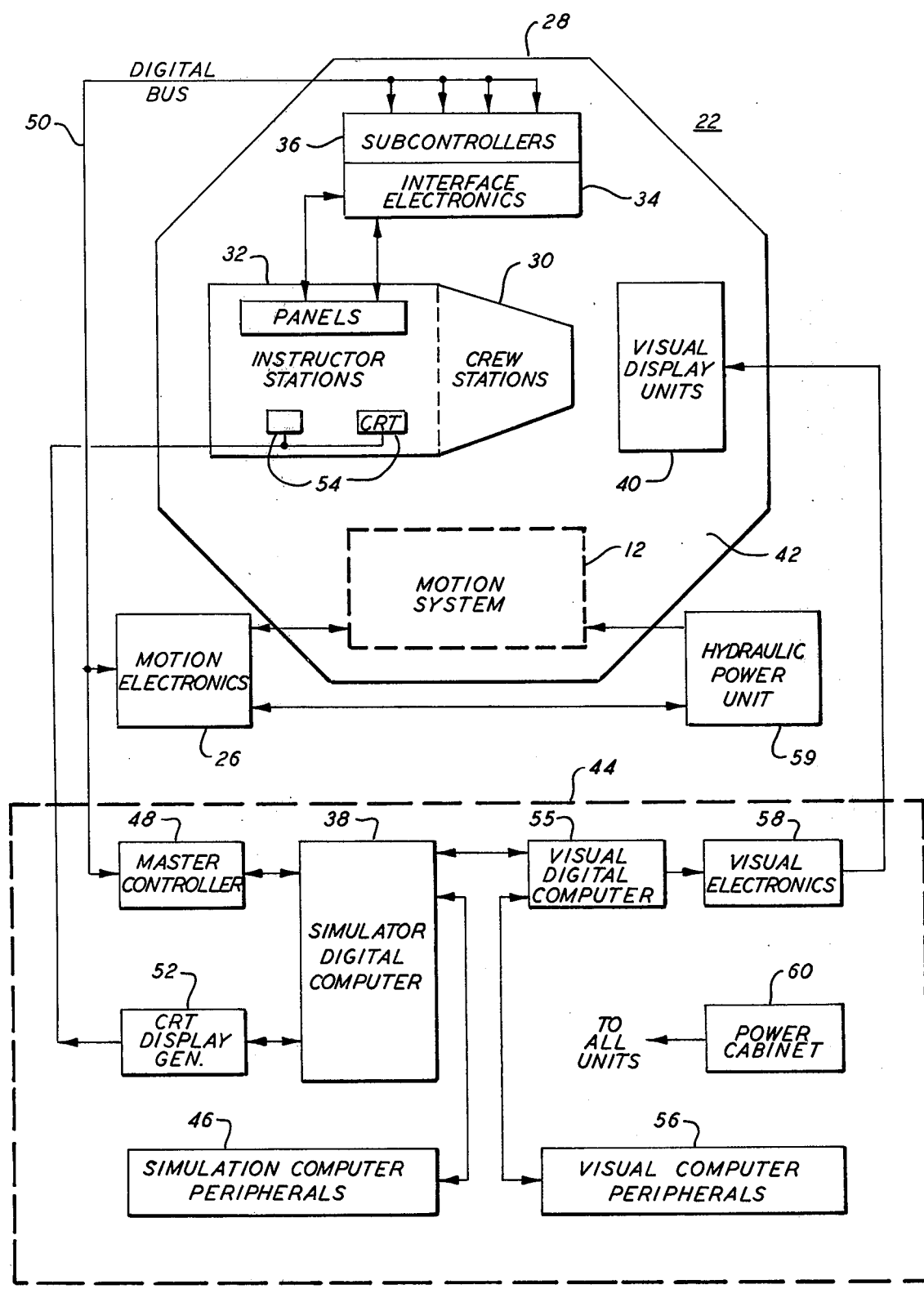
FIG. 3 is a functional block diagram of a flight simulator incorporating the basic simulator unit.

Before describing the BSU in detail, the overall configuration and interconnection of the various components of the flight simulator of the instant invention will be discussed, with reference to the functional block diagram of FIG. 3. The components of the flight simulator can be grouped in five major areas: the flight compartment area (BSU), motion system, computer area, hydraulic pump area, and power and miscellaneous equipment.

The flight compartment area 22 is completely enclosed by an octagonal enclosure 28 and mounted atop the motion system 12. Enclosure 28 contains: a simulated flight compartment 30, containing replicas of the crew stations; an instructor station 32, aft of the crew stations, with positions for two instructors and an observer; real-time interface equipment 34 and associated sub-controllers 36 which interconnect a remote digital computer 38 with the controls, instruments and indicators in the flight compartment; visual display units 40; and a maintenance platform 42.

The BSU is supported and moved by a motion system 12 which can comprise the well known synergistic six degree of freedom system or any other available motion system. A cabinet 26 for the motion electronics is located near the base of the motion system.

The computer area 44 includes the simulator digital computer 38 and peripheral equipment 46. A master controller 48 connects the digital computer 38 with the real-time interface electronics 34 in the BSU and the motion electronics in cabinet 26. Signals are transmitted between the master controller and said electronics via a single cable digital bus 50, "daisychained" from master controller 40 to sub-controllers associated with said electronics. This interconnection system, which eliminates the maze of connecting cables required by previous systems, is fully described in a commonly assigned, co-pending U.S. application entitled Data Transmission System Ser. No. 795,320, filed May 9, 1977 by Robert N. Haas/Carl A. Mazzini.

Also associated with the simulator digital computer 38, is a CRT display generator 52 which provides display signals to the instructors' CRT's 54 in a well known fashion. The computer area can further include a digital computer 55, computer peripheral equipment 56 and image generation electronics 58 for a visual display system if desired. The computer area can be located in the same room as the BSU or in a separate room.

The hydraulic pump area contains the hydraulic power unit 59 for the motion system. This unit is usually installed in a separate room.

A power control and distribution cabinet 60 provides electrical power to all units of the simulator. This cabinet can be installed in any convenient location, e.g., in the computer area.

The arrows in FIG. 2 illustrate the interaction of these various components of the flight simulator.

Figure 4:
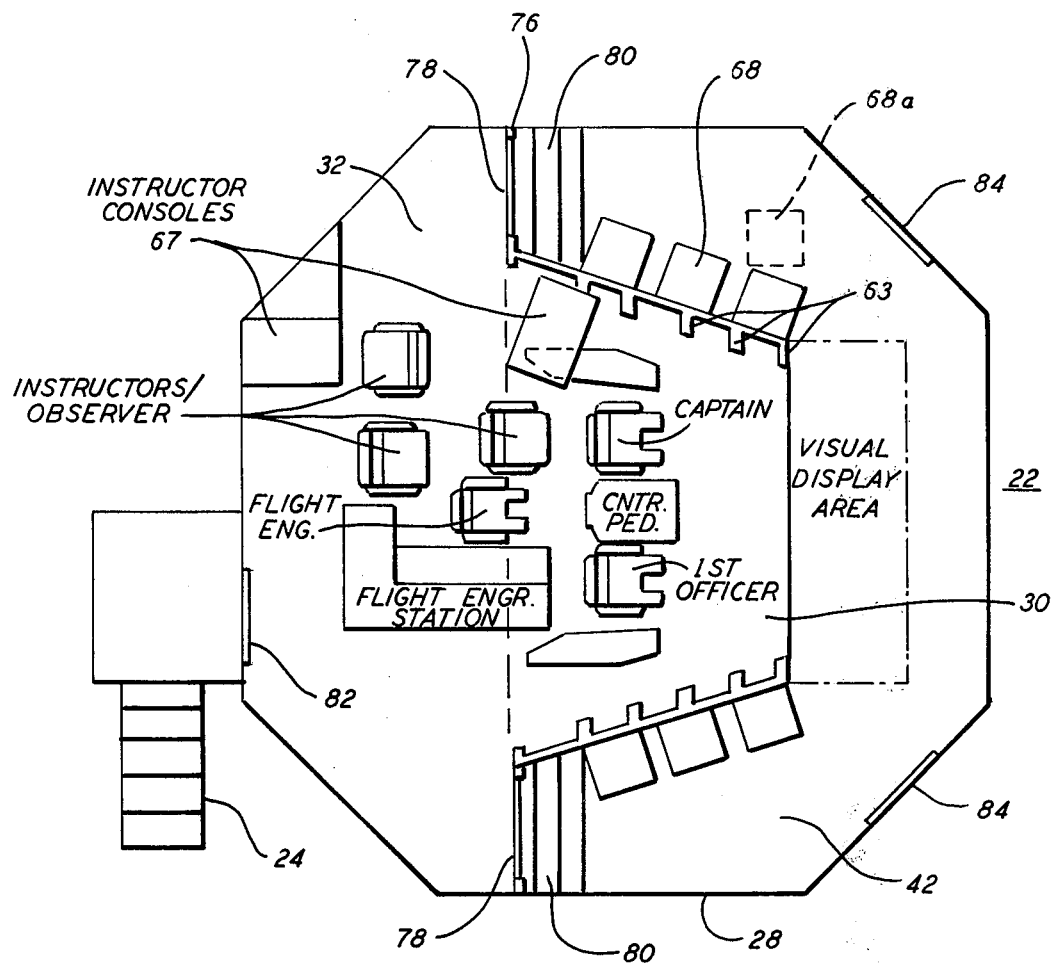
FIG. 4 is a drawing of the floor plan of the basic simulator unit.

Referring to both the perspective view of FIG. 2 and the floorplan of FIG. 4, a first embodiment of the basic simulator unit 22 of the instant invention will now be described in detail. At the center of the BSU is a simulated flight compartment or cockpit 30. The simulated flight compartment is located within a rigid framework 62 consisting of curved, spaced apart struts 63, and is supported by a raised cockpit floor frame 64. The cockpit framework provides support for all flight compartment equipment (other than floor mounted equipment) including panels, windows, air conditioning outlets, cockpit liners, and other aircraft interior fittings normally attached to the aircraft frame. The framework is of an open latticework design so as to provide convenient access to the back of cockpit hardware normally enclosed by the outer "skin" of conventional simulators.

The open strut construction of the cockpit results from recognition that the traditional strict adherence to aircraft related exterior profile is unnecessary for effective simulation. The BSU simulates only that portion of the aircraft's exterior which is within the normal field of view of the crew members; elsewhere only a skeleton of the aircraft is provided. This open strut construction permits easy installation and maintenance of all cockpit mechanical and electrical hardware and is unique in flight simulation.

Unlike its exterior, the interior of the simulated flight compartment (shown in cutaway view in FIG. 2) physically replicates the flight crew portion of the actual aircraft. All interior fittings are as per the actual aircraft. The visual appearance of the cockpit to the crew members is thus identical to that of the actual aircraft. The cockpit equipment will generally be identical not only in appearance and location but also in actuation and performance.

An instructor station area 32 (FIG. 4) with facilities for a pilot instructor, flight engineer instructor, and observer, is provided in the simulated flight compartment, aft of the crew station. The seats and consoles in this area are located so that the instructors can be in close proximity to their respective trainees while concurrently operating their instructor controls. The instructor consoles 67 might typically comprise a CRT monitor linked to the simulator computer and displaying the state of flight of the simulator or information relating to the lesson underway, and an attached keyboard enabling the instructor to control the aircraft systems and create trial emergency procedures.

Virtually all of the simulator's interface and auxiliary electronics are installed in electronics racks 68 mounted within the BSU. Three racks are preferably positioned on each side of the simulated flight compartment. These racks contain the card files into which the printed circuit cards of the interconnection system are inserted. The racks have no outer "skin" and can be rotated outboard as shown at 68a, thus providing complete and convenient maintenance access not only to the interface electronics but also to the cockpit equipment.

The location of the electronic equipment as close as possible to the aircraft hardware it services, permits short, direct cable lines between the controls and instruments of the flight deck and the six bins of associated printed circuit boards. Furthermore, elimination of the outer "skin" from the flight compartment and electronics racks eliminates the complexity and high labor costs associated with threading interconnect cabling through an enclosed structural frame and bringing it to a common duct run, as was previously required.

The cockpit framework 62 is mounted on, and the open racks 68 are located next to, the cockpit platform or floor frame 64. This platform mounts the aircraft controls within it and supports all aircraft floor-mounted structures. Its size is preferably standardized to accommodate different aircraft cockpits with a minimum of detail change from aircraft to aircraft.

Extending out from the base of cockpit platform 64 is a floor structure 42 which provides a maintenance walkway around the sides and front of the simulated flight compartment. This walkway provides unusually convenient access to all flight compartment equipment, interface electronics and visual display units within the BSU enclosure.

Visual display units 40, supported from floor 46 or securely mounted to the cockpit framework 62, can be installed in the visual display area in front of the simulated cockpit. Any of the many different visual display units used with flight simulators can be employed in the BSU.

An all-encompassing enclosure 28 provides a light-tight, dust-free, air-conditioned environment for the simulated cockpit, electronic equipment, and visual displays. The BSU enclosure preferably has a regular octagonal cross-section with eight flat side members 70 meeting at 45 degree angles. Sloping roof members 72 also make a 45-degree angle with the vertical sidewalls 70 and the horizontal roof panels 74. The interior of the enclosure is divided by a partition 76 into an air crew and instructor section, and a maintenance section, the former being on raised platform 64. Passage between the two sections is facilitated by a pair of doors 78 and steps 80. Entrance to and exit from the enclosure is through a door 82 opening on to access device 24 at the rear of the enclosure. Two additional exits 84 are provided in the maintenance area.

Use of the BSU enclosure, grouping much of the simulator equipment in a confined area, facilitates installation of an efficient and economical fire detection and extinguishing system (not shown). Further, the enclosure provides a controlled environment which enhances personnel comfort, equipment cooling, visual installation and equipment reliability. The BSU enclosure is unique in fulfilling all of these functions in one continuous structure.

Figure 5:
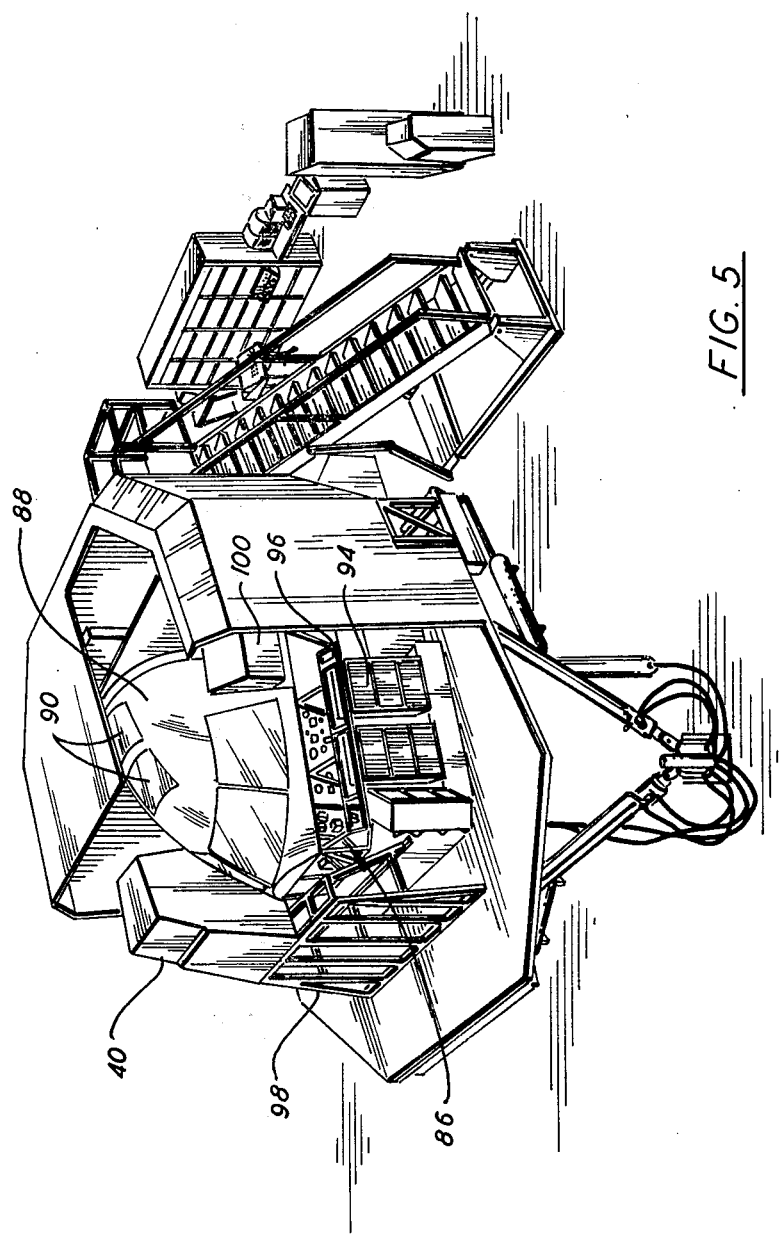
FIG. 5 is a perspective cut-away view of an alternative and preferred embodiment of the basic simulator unit.

An alternate and presently preferred embodiment of the BSU is depicted in FIG. 5. In this embodiment, beam members or struts are welded together to form a rigid, open framework 86 which provides ready access to the cockpit equipment and supports an abbreviated fiberglass shell 88. Shell 88 extends below the lower window line only as far as necessary to simulate that portion of the aircraft's exterior which is normally visible to the crew members through the windows of the actual aircraft. Holes 90 cut in the top portion of the shell 88 provide ready access to the rear of the overhead panels.

Along each side of the framework 86 are three P.C. card bins 94 pivotally connected to a common tubular steel frame 96. In front of the simulated cockpit, a visual display unit 40 is mounted on a typical support structure 98. Reference character 100 denotes the protruding rear end of an instructor console. Otherwise, this embodiment of the BSU is identical to that described earlier.

The basic simulator unit described above provides numerous advantages over earlier flight simulators. The most striking of these is the greater maintainability the BSU affords through improved accessibility to cockpit equipment and interface electronics. The open and hinged construction of the electronics racks maximizes equipment serviceability, while the cockpit strut construction and maintenance walkway permit maintenance of cockpit equipment to be accomplished from the outside. Reduced repair time, greater simulator availability and significantly lower life cycle costs are the benefits that directly accrue from these construction features.

The location of the electronics racks adjacent the cockpit and the elimination of the outer "skin" from these racks and the cockpit allow short and direct cable runs. Since there is no need to package any simulation electronics in the cockpit interior, as was done on earlier simulators, this area is left uncluttered and looks more like the aircraft in appearance. The physical configuration and additional room in the cockpit area also allows optimization of the instructors' location so that the instructors can look over the trainees' shoulders and simultaneously operate their controls.

The BSU enclosure creates a closed and clean environment which greatly facilitates personnel air conditioning and equipment cooling. Since the enclosure is light tight, no external cover is required on the visual display units. The enclosure also permits installation of an efficient and economical fire protection system.

By packaging most of the simulator equipment in the BSU enclosure, a significant reduction in facility floor space is produced. The BSU design also facilitates simulator shipment and reduces the engineering requirements in changing from one aircraft to another. Finally, by locating the BSU equipment as shown, a balanced load with respect to the center of gravity point of the motion system is achieved, and since the equipment is close to the motion centroid, reduced moments of inertia are obtained.

Various modifications may be made to the embodiments described above, without departing from the principles of the invention. Instead of the eight sided compartment, a dome or other differently shaped enclosure, with a matching floor plan, could be used. The open cockpit construction could be achieved via a succession of standard hoop frames interconnected into a rigid framework and spaced as per a desired aircraft. There could exist a "library" of such standard frames made up into a list of parts for a particular aircraft as required. Alternatively, existing fiberglass shells could have access holes cut out along the sides thereof.

Furthermore, the open racks could be made to hinge, slide or pivot in any manner that provides access and maintainability. Variations in the number and location of these racks, as well as in the nature of the visual system are also contemplated. It might, for example, be possible to use the inside surface of the BSU enclosure as a screen for a projection visual system. Of course, the interior of the simulator cockpit will reflect the particular aircraft being simulated, and the layout of the instructor station can vary as desired. The basic simulator unit can be used to simulate military or commercial aircraft, as well as other vehicles. Other possible modifications, variations and applications will suggest themselves to those of ordinary skill in the art.

Having fully described our invention, what we claim and desire to protect by letters patent is:

1. A basic simulator unit for vehicle simulation comprising:
    a simulated crew station, the interior of said simulated crew station comprising an enclosed replica of the interior equipment of the crew station of the vehicle being simulated, and the exterior sides of said simulated crew station comprising an open framework which provides direct access to said replicated interior equipment from outside of said simulated crew station without interfering with the environmental fidelity of the interior;
    at least one electronics rack adjacent said open framework;
    a maintenance walkway bordering said simulated crew station;
    an enclosure completely enclosing said simulated crew station, electronics rack and maintenance walkway; and
    a motion system for supporting and moving said enclosed station, rack, walkway and enclosure.

2. The invention of claim 1 wherein said motion system includes means for imparting movement to said basic simulator unit in at least three degrees of freedom.

3. The invention of claim 2 wherein said motion system comprises a synergistic six degree of freedom motion system;
    said walkway extends along the sides and front of said simulated crew station; and
    said at least one electronics rack comprises a plurality of uncovered, pivotable, printed circuit board bins located alongside of the simulated crew station.

4. The invention of claim 3 wherein said simulated crew station comprises a simulated aircraft cockpit having no outer skin on portions of its fuselage.

5. The invention of claim 1 wherein said open framework comprises a series of curved spaced apart struts.

6. The invention of claim 1 further including an instructor station located behind said simulated crew station.

7. The invention of claim 5 further including a raised platform for supporting the simulated crew station and instructor station at a higher elevation than the maintenance walkway.

8. The invention of claim 1 wherein said electronics rack comprises an open and displaceable bin for printed circuit cards.

9. The invention of claim 1 wherein said open framework supports crew station controls and indicators, and
    said electronics rack supports interface electronics which connect said controls and indicators to a remote computer.

10. The invention of claim 1 further including a visual display area in front of said simulated crew station and within said enclosure.

11. The invention of claim 10 further including means located in said visual display area for providing a visual display to an occupant of said simulated crew station.

12. The invention of claim 1 wherein said open framework comprises a welded beam structure.

13. The invention of claim 1 wherein said simulated crew station exterior further includes an abbreviated shell simulating the exterior portion of the vehicle within the field of view of the crew.

14. The invention of claim 1 wherein said enclosure has an octagonal cross section.

15. The invention of claim 1 wherein said enclosure is light-tight.

16. Apparatus for use in flight simulation comprising:
    a simulated flight compartment, the interior of said compartment comprising an enclosed duplicate of the equipment in the crew station of the aircraft being simulated, and the exterior of said compartment comprising an uncovered structural skeleton which provides maintenance access to said equipment from the outside of said compartment without interfering with the environmental fidelity of the interior;
    an enclosed maintenance walkway around the front and sides of said simulated flight compartment; and
    a motion system for supporting and imparting controlled movement to said simulated flight compartment and associated walkway.

17. The apparatus of claim 16 further including an open electronics rack located alongside said simulated flight compartment and also supported by said motion system.

18. The apparatus of claim 17 further including an instructor/observer station supported by said motion system.

19. The apparatus of claim 18 further including an all encompassing enclosure supported by said motion system and containing said simulated flight compartment, electronics rack, maintenance walkway and instructor/observer station.

20. The apparatus of claim 19 further including visual display means within said enclosure for displaying extra-cockpit visual information which would appear to the pilot of the aircraft being simulated.

21. The apparatus of claim 16 wherein said uncovered structural skeleton comprises an open strut construction in areas of the exterior of said compartment which correspond to external portions of the actual aircraft fuselage which are not normally visible to crew members through the windows of the aircraft.

* * * * *